United States Patent [19]

Suzuki et al.

[11] Patent Number: 4,841,511

[45] Date of Patent: Jun. 20, 1989

[54] CONSTANT LINEAR VELOCITY DISK ROTATING APPARATUS

[75] Inventors: Motoyuki Suzuki; Yoshio Miura; Akio Fukushima, all of Yokohama, Japan

[73] Assignee: Hitachi, Ltd., Tokyo, Japan

[21] Appl. No.: 109,315

[22] Filed: Oct. 19, 1987

[30] Foreign Application Priority Data

Oct. 17, 1986 [JP] Japan ................ 61-245348

[51] Int. Cl.$^4$ ............................................. G11B 19/24
[52] U.S. Cl. ............................................. 369/50
[58] Field of Search ............ 358/322, 338, 342; 360/73; 369/50, 240, 111; 318/314

[56] References Cited

U.S. PATENT DOCUMENTS

| | | | |
|---|---|---|---|
| 3,654,479 | 4/1972 | Catherin | 318/314 |
| 4,061,950 | 12/1977 | Kayanuma | 318/314 |
| 4,223,349 | 9/1980 | Dakin et al. | 358/342 |
| 4,423,498 | 12/1983 | Kimura et al. | 369/50 |
| 4,439,849 | 3/1984 | Nabeshima | 369/50 |
| 4,481,615 | 11/1984 | Hioki | 369/50 |
| 4,514,771 | 4/1985 | Stark et al. | 360/73 |
| 4,532,561 | 7/1985 | Kimura et al. | 360/73 |
| 4,625,156 | 11/1986 | Komiya et al. | 318/314 |
| 4,641,294 | 2/1987 | Yoshimaru | 369/50 |
| 4,647,828 | 3/1987 | Wachi | 369/50 |
| 4,672,595 | 6/1987 | Senso | 369/50 |
| 4,675,855 | 6/1987 | Iso et al. | 369/50 |
| 4,680,746 | 7/1987 | Senso | 369/50 |
| 4,750,055 | 6/1988 | Van Lier | 369/50 |

*Primary Examiner*—Donald McElheny, Jr.
*Attorney, Agent, or Firm*—Antonelli, Terry & Wands

[57] ABSTRACT

A constant linear velocity disk rotating apparatus for rotating a disk storing data recorded therein substantially at fixed linear recording speed detects a signal recorded in the disk by signal detecting means, obtains a control signal through the comparison of phase of the signal detected from the disk and that of a reference signal by phase comparing means, and controls the rotating speed of the disk on the basis of the control signal. To maintain the sensitivity of phase error detection which tends to vary in proportion to the radial position r of the signal detecting means relative to the disk at a fixed level, the gain of the phase control system is regulated in inverse proportion to the radial position r of the signal detecting means according to the output of detecting means which detects the rotating frequency or period of the disk. The control signal provided by the phase comparing means is applied to disk driving means after regulating the gain thereof by varying the duty factor in transmitting the control signal to the disk driving means.

9 Claims, 5 Drawing Sheets

CONSTANT LINEAR VELOCITY DISK ROTATING APPARATUS

BACKGROUND OF THE INVENTION

The present invention relates to a disk rotating apparatus and, more particularly, to a constant linear velocity disk rotating apparatus for rotating disks, such as video disks and digital audio disks, carrying video data recorded therein through a constant linear velocity recording process.

The optical disk player is an exemplary apparatus for recording signals such as video signals or audio signals on signal tracks on a disk at a high signal density and for reproducing the signals recorded on the signal tracks.

A disk rotating speed controller for controlling the rotating speed of the disk on such an optical disk player is disclosed, for example, in U.S. Pat. No. 4,223,349. This disk rotating speed controller compares the phase of a signal obtained from the disk and that of a reference signal and controls the rotating speed of the spindle motor of the optical disk player so that the respective phases of the signal obtained from the disk and the reference signal coincide with each other. The sensitivity of detecting the phase error rises toward the periphery of the disk. Therefore, the gain of the amplifier needs to be regulated according to the radial position of the optical pickup, namely, a detector, to regulate the gain of the control system.

It is possible to detect the radial position of the optical pickup with a potentiometer interlocked with the optical pickup. However, employment of a potentiometer for detecting the radial position of the optical pickup requires work for interlocking the potentiometer with the optical pickup and for adjusting the potentiometer and makes the construction of the disk rotating speed controller complex.

SUMMARY OF THE INVENTION

Accordingly, it is a principal object of the present invention to provide a disk rotating apparatus capable of eliminating the drawbacks of the prior art, capable of accurately regulating the gain of the control system without using any detector, such as a potentiometer, for detecting the position of the pickup, simple in circuit construction, and capable of being manufactured at a low cost.

To achieve the object of the invention, the present invention provides a disk rotating apparatus provided with a frequency signal generator which generates a frequency signal corresponding to the rotating frequency the disk, and adapted to regulate the gain of the control system according to the period or frequency of the output pulse signal of the frequency signal generator.

DESCRIPTION OF THE PREFERRED EMBODIMENTS

Preferred embodiments of the present invention will be described hereinafter with reference to the accompanying drawings.

Figure 1:
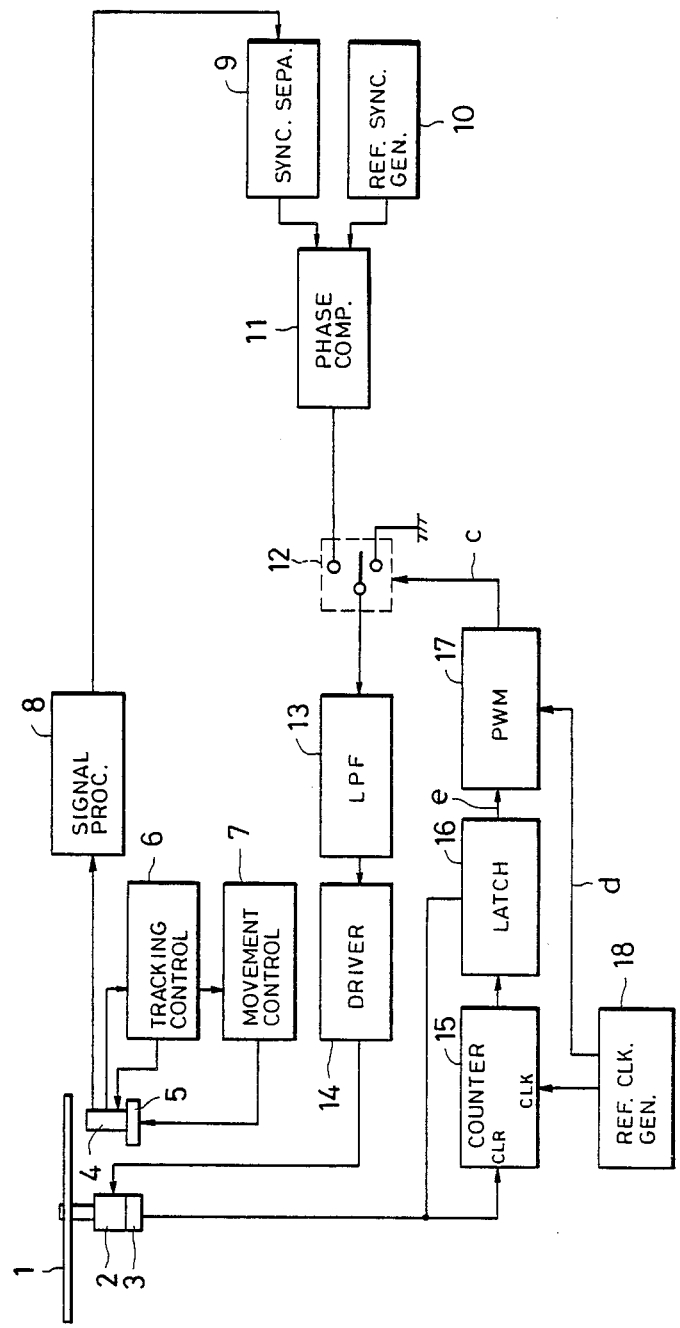
FIG. 1 is a block diagram showing a constant linear velocity disk rotating apparatus, in a first embodiment, according to the present invention.

Referring to FIG. 1 showing a constant linear velocity disk rotating apparatus (hereinafter referred to as "CLV disk rotating apparatus"), in a first embodiment, according to the present invention, there are shown a constant linear velocity disk (hereinafter, abbreviated to "CLV disk") 1, a motor 2 for rotating the CLV disk 1, a pickup 4 which focuses a laser beam in a spot on the CLV disk 1 and generates electric signals on the basis of the laser light reflected by the CLV disk 1, a slider 5 mounted with the pickup 4, a tracking control circuit 6 for controlling the pickup 4 so that the spot of the laser beam follow the wavy motion of the tracks of the CLV disk 1 attributable to the eccentric disposition of the CLV disk 1 relative to the motor 2, a shift control circuit 7 for controlling the radial movement of the slider 5 relative to the CLV disk 1, a signal processing circuit 8 which processes electric signals given thereto by the pickup 4 to provide reproduced signals, a reproduced synchronizing signal filtering circuit 9 which extracts reproduced synchronizing signals from the reproduced signals, a reference synchronizing signal generator 10 which generates reference synchronizing signals, a phase comparator 11 which compares the output of the reproduced synchronizing signal filtering circuit 9 and the output of the reference synchronizing signal generator 10, a low-pass filter (hereinafter abbreviated to "LPF") 13, a driving circuit 14 which drives the motor 2 according to the output of an amplifier 20.

The manner of operation of the CLV disk rotating apparatus shown in FIG. 1 will be described hereinafter.

In the ordinary signal reproducing operation, the tracking control circuit 6 controls the pickup 4 so that a light spot follows a track on the disk 1. Electric signals generated by the pickup 4 are processed by the signal processing circuit 8 to provide reproduced signals. The shift control circuit 7 shifts the slider 5 mounted with the pickup 4 radially of the disk 1 with the progress of the signal reproducing operation according to the DC component of a tracking control signal. The reproduced synchronizing signal filtering circuit 9 filters a synchronizing signal from the reproduced signals. The phase comparator 11 compares the synchronizing signal filtered from the reproduced signal and a reference synchronizing signal provided by the reference synchronizing signal generator 10.

The driving circuit 14 drives the motor 2 according to the output of the phase comparator 11 given thereto through the LPF 13 to rotate the disk 1 at a rotating speed which makes the phase difference between the phase of the regenerated synchronizing signal and that of the reference synchronizing signal is reduced to zero. This control system will be designated as a phase control system hereinafter.

The linear velocity V of the disk 1 is expressed by $$V = 2\pi \cdot f \cdot r \tag{1}$$

where f is the rotating frequency of the disk 1, and r is the radius of the disk 1.

The number N of pulses of the synchronizing signal recorded in the disk 1 during one turn of the disk 1 is expressed by $$N = f_H/f \tag{2}$$

where $f_H$ is the frequency of the synchronizing signal recorded in the disk 1.

When V=constant, the rotating frequency f is inversely proportional to the radius r, and the number N of pulses of the synchronizing signal is proportional to the radius r. Detection sensitivity S in detecting the variation of the phase of the disk 1 is expressed by $$S = N \cdot V_c/2\pi \tag{3}$$

where $V_c$ is an error voltage for the maximum phase difference ($\pi$). Since the number N of pulses of the synchronizing signal recorded in the disk 1 during one turn of the same is proportional to the radius r of the disk 1, the detection sensitivity S is proportional to the radius r, and hence the detection sensitivity becomes higher toward the periphery of the disk 1.

Also shown in FIG. 1 are a frequency signal generator 3 directly coupled with the output shaft of the motor 2 to generate pulses of a frequency corresponding to the rotating frequency of the disk 1, a LPF 13, a reference clock generator 18, a counter 15 which counts the output pulses of the reference clock generator 18 on the basis of the output pulse of the frequency signal generator 3, a latch circuit 16 which latches the count of the counter 15 on the basis of the output pulse of the frequency signal generator 3, a PWM (Pulse Width Modulation) circuit 17 for varying the duty factor in transmitting the output of the phase comparator 11 to the LPF 13, and a switch 12 for interrupting the transmission of the output of the phase comparator 11 to the LPF 13 according to the output of the PWM circuit 17.

The frequency of the output pulses of the frequency signal generator 3 corresponds to the rotating frequency f of the disk 1, while the rotating frequency f of the disk 1 is inversely proportional to the radius r of the disk 1. Hence the period T=1/f of rotation of the disk 1 is proportional to the radius r of the same. Accordingly, the radius r of the disk 1 is proportional to the period and is inversely proportional to the frequency of the output pulses of the frequency signal generator 3.

When the periods of the output pulses of the frequency signal generator 3 is counted on the basis of the reference clock signal of a fixed frequency, the count $C_N$ is proportional to the radius r of the disk 1. That is, $$C_N \propto r \tag{4}$$

Therefore, the radius r of the disk can be determined from the count $C_N$.

When the count $C_N$ of the output pulses of the frequency signal generator 3 in a fixed time is proportional to the rotating frequency f and is inversely proportional to the radius r of the disk 1, and hence the radius r can be determined from the count $C_N$. That is, $$C_N \propto 1/r \tag{5}$$

The stable operation of the phase control system can be secured regardless of the position of reproduction on the disk 1 by varying the gain in inverse proportion to the radius r of the disk according to the count $C_N$ obtained in the manner as explained hereinbefore. That is, in the CLV disk rotating apparatus shown in FIG. 1, the periods of the output pulses of the frequency signal generator 3 are counted by the counter 15 on the basis of the clock signal of a fixed frequency generated by the reference clock signal generator 18. The latch circuit 16 latches the count $C_N$ of the counter 15 in synchronism with the output pulses of the frequency signal generator 3. The count $C_N$ latched by the latch circuit 16 is proportional to the radius r (Expression (4)).

The PWM circuit 17 controls the switch 12 on the basis of the count $C_N$ so that the duty factor $D_N$ of the switch 12 in transmitting the output signal of the phase comparator 11 to the LPF 13 is inversely proportional to the count $C_N$. That is, $$D_N \propto 1/C_N \tag{6}$$

Therefore, $$D_N \propto 1/r \tag{7}$$

Figure 2:
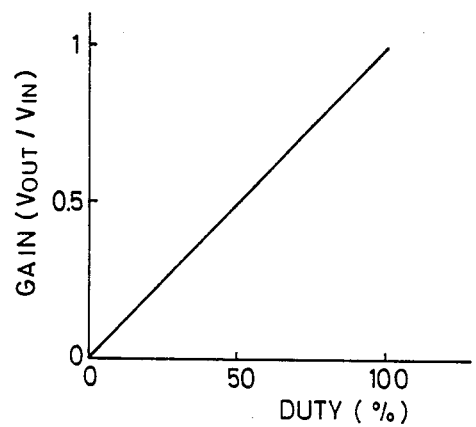
FIG. 2 is a graph showing the variation of the gain of a circuit from the switch to the low-pass filter of the circuit of FIG. 1 with the duty factor of the switch.

In transmitting the output of the phase comparator 11 through the switch 12 and the LPF 13 to the driving circuit 14, the switch 12 is controlled for on-off operation through pulse width modulation of a sufficiently high frequency as compared with the frequency band of the phase control system, in which the gain characteristics varies with the duty factor $D_N$ of the switch 12 as shown in FIG. 2, from which $$G \propto D_N \tag{8}$$

where G is the gain. From Expressions (7) and (8), $$G \propto 1/r \tag{9}$$

On the other hand, from Expressions (1), (2) and (3), the sensitivity S of detection of the variation of the phase of the disk 1 is proportional to the radius r. Accordingly, the gain GxS in transmitting the output of the phase comparator 11 to the LPF 13 is constant irrespective of the radius r, so that the phase control system is able to operate stably.

Figure 3:
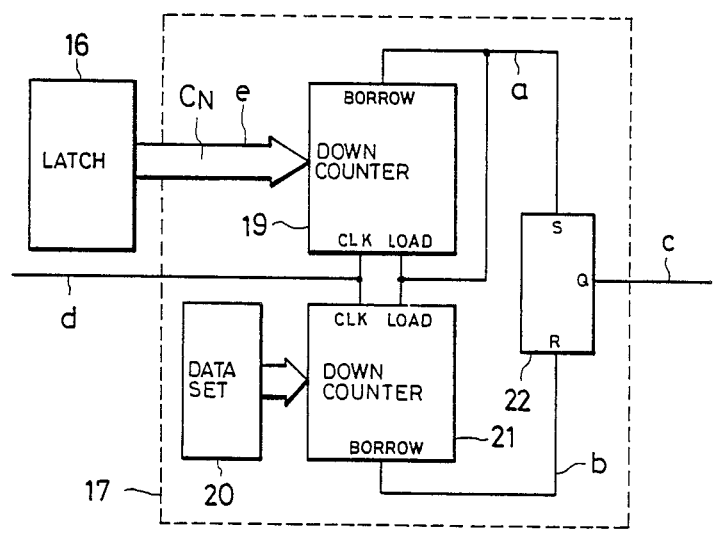
FIG. 3 is a block diagram showing a pulse width modulating circuit incorporated into the constant linear velocity disk rotating apparatus of FIG. 1.

Referring to FIG. 3, the PWM circuit 17 comprises a down counter 19 which divides the output clock signal d of frequency $f_{CLK}$ of the reference clock signal generator 18 on the basis of the count $C_N$ of the counter 15 given thereto by the latch circuit 16, a data setting circuit 20, a down counter 21, and a flip flop 22. The data setting circuit sets a data $C_o$ to be set in the down counter 21. The down counter 21 gives a reset signal b to the flip flop 22 in a time corresponding to the data $C_o$ after the reception of the output pulse of the down counter 19. The flip flop 22 is set by the divided clock signal a provided by the down counter 19 and is reset by the output b of the down counter 21.

Figure 4:
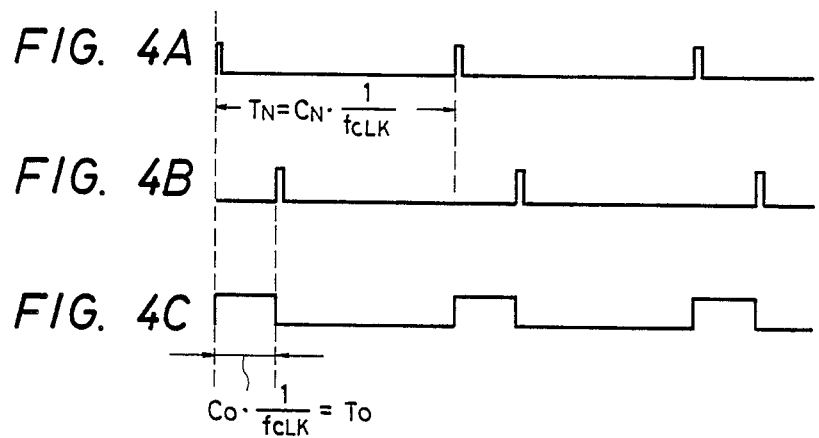
FIGS. 4A, 4B and 4C are timing charts of assistance in explaining the manner of operation of the pulse width modulating circuit of FIG. 3.

The down counter 19 divides the clock signal d by the count $C_N$ given thereto by the latch circuit 16. The period $T_N$ of the output signal a of the down counter 19, as shown in FIG. 4A, is given by $$T_N = C_N \cdot 1/f_{CLK} \tag{10}$$

Time $T_o$ between the leading edge of a pulse of the output signal a of the down counter 19 obtained by dividing the clock signal d and the leading edge of a pulse of the output reset signal b of the down counter 21 (FIG. 4C) is determined according to the data $C_o$ given to the down counter 21 by the data setting circuit 20 by an expression:

$$T_o = C_o \cdot 1/f_{CLK} \tag{11}$$

Accordingly, the duty factor $D_N$ of the output signal c of the flip flop 22 is $$D_N = T_o/T_N = C_o/C_N \propto 1/C_N \tag{12}$$

Thus, the condition defined by Expression (6) is satisfied through pulse width modulation.

Figure 5:
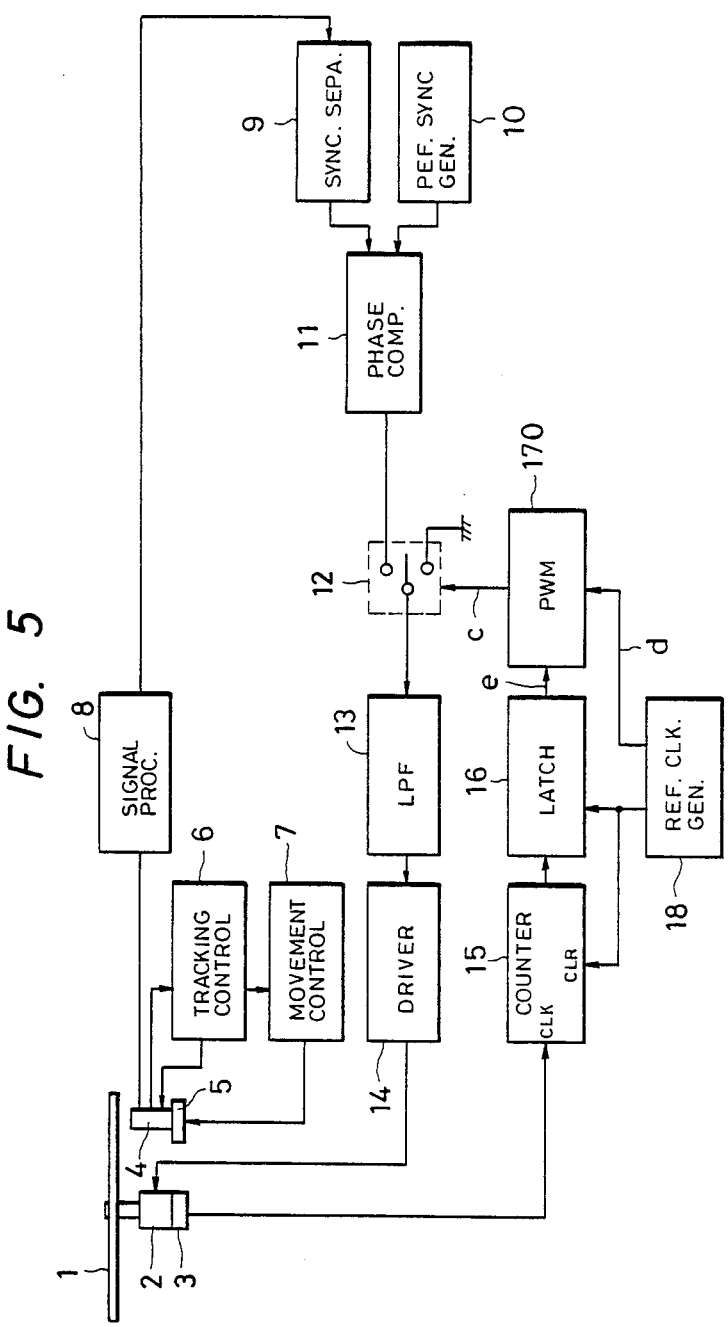
FIG. 5 is a block diagram showing a constant linear velocity disk rotating apparatus, in a second embodiment, according to the present invention.

A CLV disk rotating apparatus, in a second embodiment, according to the present invention is shown in FIG. 5.

The second embodiment is different from the first embodiment in that the number of output pulses of a frequency signal generator 3 in a fixed time is counted by a counter 15. The count $C_N$ of the pulses counted by the counter 15 is proportional to the rotating frequency f of the disk 1 and is inversely proportional to the radius r of the disk 1 as expressed by Expression (5). When the duty factor $D_N$ of a switch 12 is controlled by a PWM circuit 170 according to the count $C_N$ so that $$D_N \propto C_N \tag{13}$$

then, $$D_N \propto 1/r \tag{14}$$

Accordingly, the gain between a phase comparator 11 and a LPF 13 can be fixed irrespective of the radius r of the disk 1.

Figure 6:
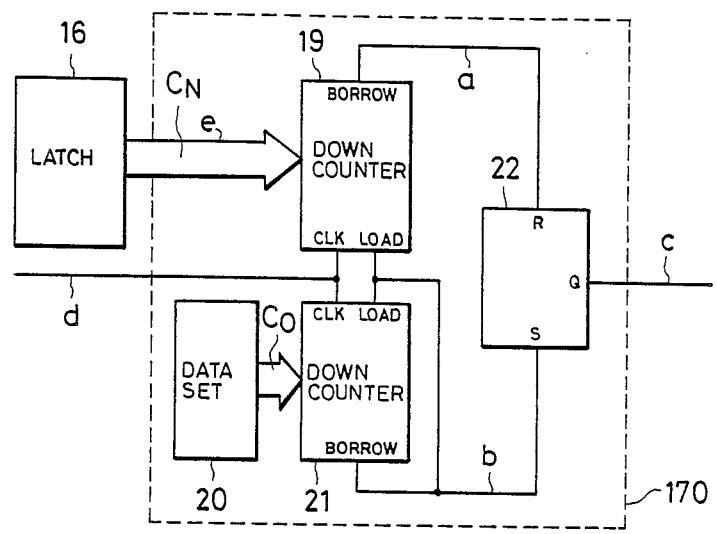
FIG. 6 is a block diagram showing a pulse width modulating circuit incorporated into the constant linear velocity disk rotating apparatus of FIG. 5.
Figure 7A:
FIGS. 7A, 7B and 7C are timing charts of assistance in explaining the manner of operation of the pulse width modulating circuit of FIG. 6.
Figure 7B:
Figure 7C:
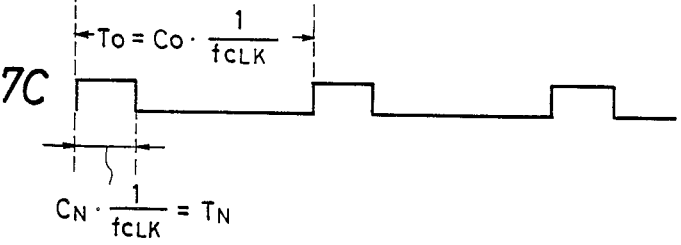

FIG. 6 shows the construction of the PWM circuit 170 employed in the CLV disk driving apparatus of FIG. 5, and FIGS. 7A, 7B and 7C are timing charts of signals processed by the PWM circuit 170 of FIG. 6.

The period $T_o$ of the output signal c of a flip flop 22 (FIG. 7B) is given by $$T_o = C_o \cdot 1/f_{CLK}$$

The pulse width $T_N$ of the output signal c (FIG. 7C) is given by $$T_N = C_N \cdot 1/f_{CLK}$$

Accordingly, the duty factor $D_N$ of the output signal c of the flip flop 22 is $$D_N = T_N/T_o = C_N/C_o \propto C_N \tag{15}$$

and thereby the condition defined by Expression (13) can be satisfied through pulse width modulation.

In the second embodiment, the frequency of the output pulses of the frequency signal generator 3 is counted by the counter 15. The gain may be varied according to a DC voltage corresponding to a frequency, obtained by a frequency-to-voltage converter. What is essential is to detect the rotating frequency or rotating period of the disk and to vary the gain according to the result of detection.

As apparent from what has been described hereinbefore, according to the present invention, the gain is varied according to the period or frequency of the output pulses of a frequency signal generator which provides a pulse signal of a frequency corresponding to the rotating frequency of the disk. Such a constitution provides a CLV disk rotating apparatus simple in construction, low in cost, and capable of accurately and stably regulating the gain.

Furthermore, variation of the duty factor in transmitting a control signal to vary the gain of the phase control system improves the accuracy of gain regulation, while a system in which the gain of an amplifier is varied needs a plurality of comparators making fine regulation difficult.

What we claim is:

1. A constant linear velocity disk rotating apparatus for rotating a disk at a constant linear velocity, comprising:

signal detecting means which detects a signal provided by a disk in which data is recorded at a constant linear velocity at different radial positions relative to the disk;

phase comparing means which compares the phase of the detection signal of said signal detecting means with that of a reference signal, and provides a control signal on the basis of the result of comparison;

driving means which drives the disk for rotation according to the control signal;

disk rotation detecting means which detects the rotating frequency or period of the disk; and gain regulating means which regulates the gain of the control signal according to the output of said disk rotation detecting means in inverse proportion to the radial position r of said signal detecting means relative to the disk;

wherein the control signal provided by said phase comparing means is supplied to said driving means after the gain of the control signal is regulated by said gain regulating means.

2. A constant linear velocity disk rotating apparatus as recited in claim 1, wherein said disk rotation detecting means comprises:

a frequency signal generator which generates a frequency signal proportional to the rotating frequency of the disk;

a reference clock generator which generates a reference clock signal; and a counter which provides a count corresponding to the frequency or period of the frequency signal on the basis of the frequency signal and the reference clock signal.

3. A constant linear velocity disk rotating apparatus as recited in claim 2, wherein said counter provides a count corresponding to the frequency of the frequency signal.

4. A constant linear velocity disk rotating apparatus as recited in claim 2, wherein said counter provides a count corresponding to the period of the frequency signal.

5. A constant linear velocity disk rotating apparatus as recited in claim 1, wherein said gain regulating means varies a duty factor in transmitting the control signal provided by said phase comparing means to said driving means.

6. A constant linear velocity disk rotating apparatus as recited in claim 5, wherein said gain regulating means comprises:

a pulse width modulating circuit which varies the duty factor of the output pulses thereof on the basis of the rotating frequency or period of the disk detected by said disk rotation detecting means;

switching means which is controlled for on-off signal transmitting operation by the output pulses of said pulse width modulating circuit; and a low-pass filter which filters the low-frequency component of the output of said switching means.

7. A constant linear velocity disk rotating apparatus as recited in claim 6, wherein said pulse width modulating circuit varies the duty factor of the output pulses thereof on the basis of the rotating frequency of the disk detected by said disk rotation detecting means.

8. A constant linear velocity disk rotating apparatus as recited in claim 6, wherein said pulse width modulating circuit regulates the duty factor of the output pulses thereof on the basis of the rotating period of the disk detected by said disk rotation detecting means.

9. A constant linear velocity disk rotating apparatus as recited in claim 1, wherein said disk rotation detecting means comprises:

a frequency signal generator which generates a frequency signal proportional to the rotating frequency of the disk; and a frequency-to-voltage converter which converts the frequency signal into a corresponding voltage signal.

* * * * *